No. 694,242. Patented Feb. 25, 1902.
W. BORCHERT.
WAVE OR TIDE MOTOR.
(Application filed Oct. 2, 1901.)
(No Model.) 2 Sheets—Sheet 1.
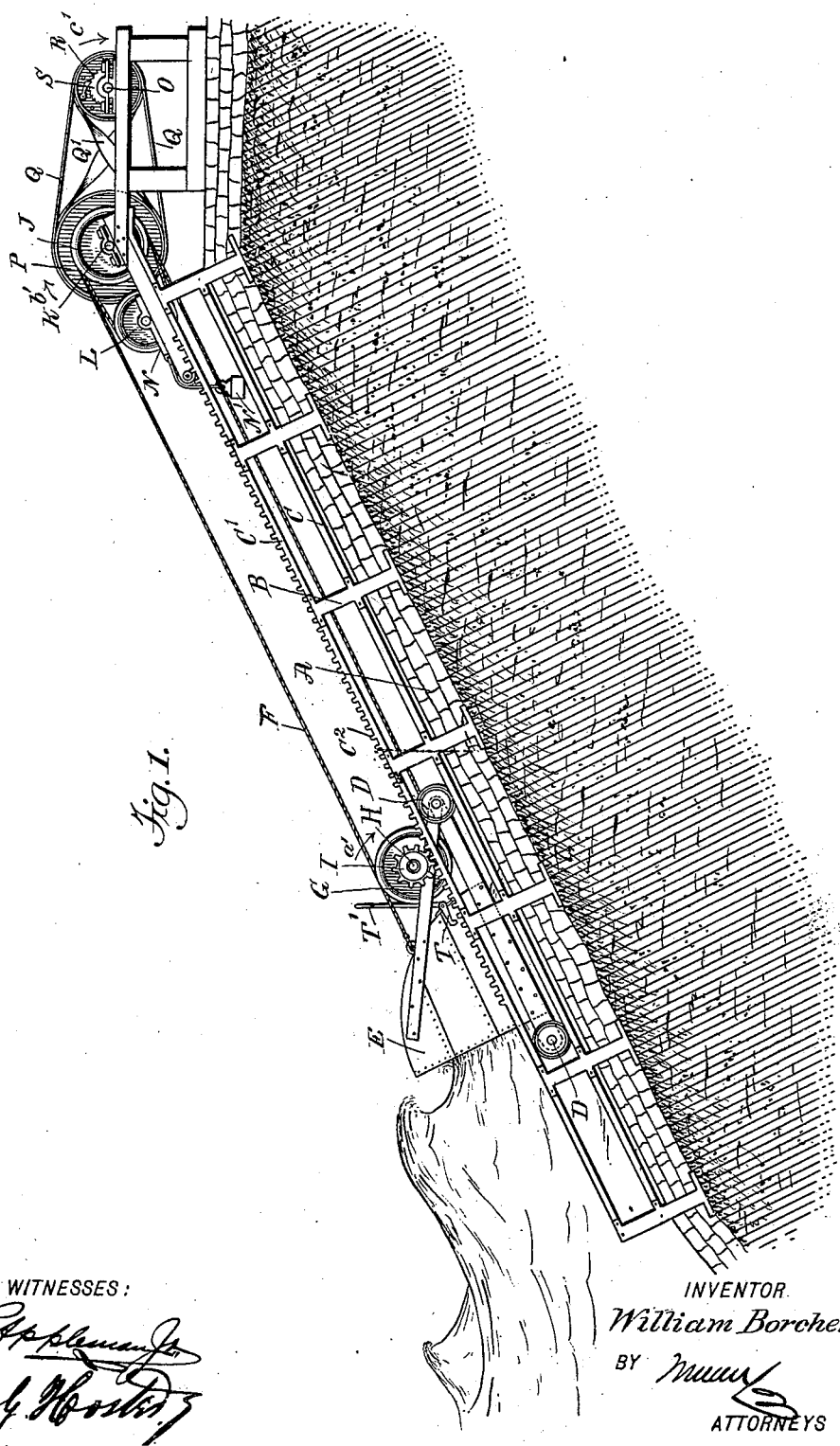
WITNESSES:
INVENTOR.
William Borchert
BY
ATTORNEYS No. 694,242. Patented Feb. 25, 1902.
W. BORCHERT.
WAVE OR TIDE MOTOR.
(Application filed Oct. 2, 1901.)
(No Model.) 2 Sheets—Sheet 2.
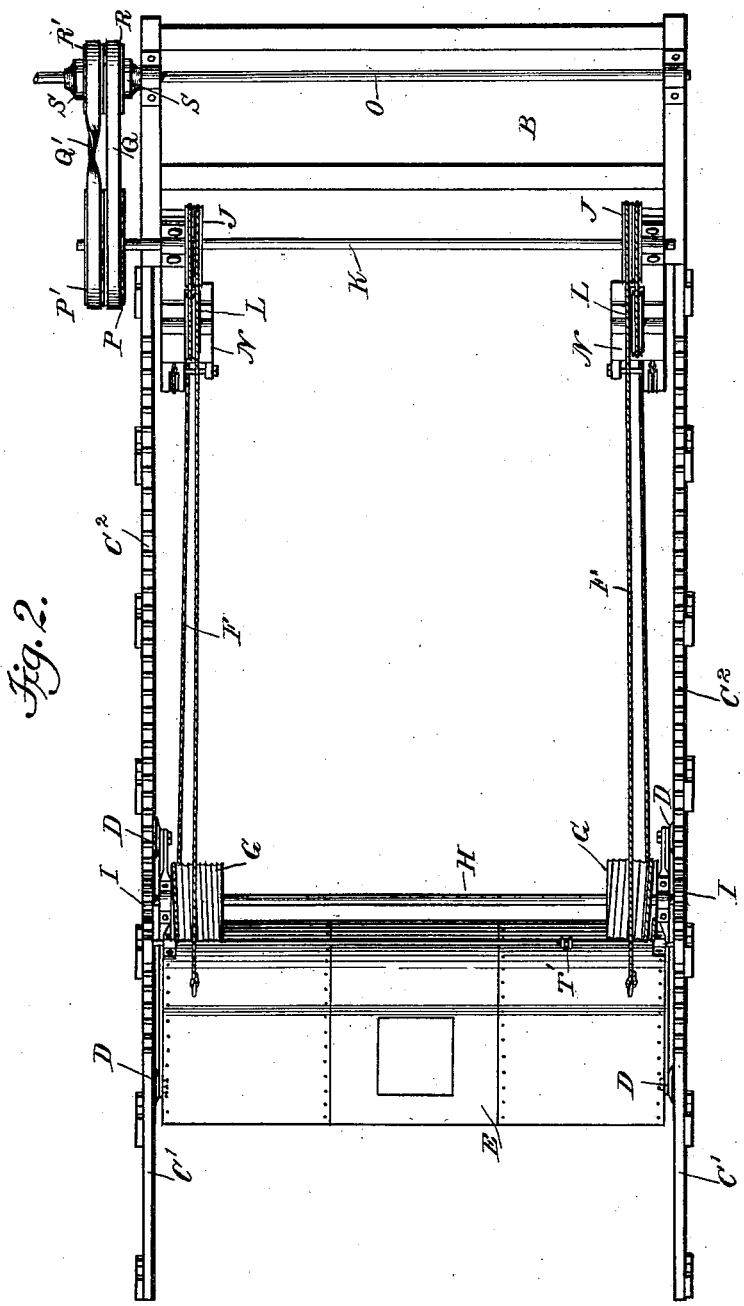
WITNESSES:
INVENTOR
William Borchert
BY
ATTORNEYS.

UNITED STATES PATENT OFFICE.

WILLIAM BORCHERT, OF CARSON CITY, NEVADA, ASSIGNOR OF ONE-HALF TO REUBEN J. KELLY AND RICHARD KIRMAN, OF CARSON CITY, NEVADA.

WAVE OR TIDE MOTOR.

SPECIFICATION forming part of Letters Patent No. 694,242, dated February 25, 1902.

Application filed October 2, 1901. Serial No. 77,262. (No model.)

*To all whom it may concern:*

Be it known that I, WILLIAM BORCHERT, a citizen of the United States, and a resident of Carson City, in the county of Ormsby and State of Nevada, have invented a new and Improved Wave or Tide Motor, of which the following is a full, clear, and exact description.

The object of the invention is to provide a new and improved wave or tide motor which is simple and durable in construction, very effective in operation, and arranged to utilize the buoyant power as well as the striking power of the waves or tides to the fullest advantage for the driving of machinery.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in both the views.

Figure 1 is a side elevation of the improvement, and Fig. 2 is a plan view of the same.

The improved wave or tide motor is mounted on a suitably-constructed foundation A, arranged close to the water's edge in an inclined direction, as plainly illustrated in Fig. 1, and on the said foundation is erected an inclined framework B, carrying on each side spaced guide-rails C C', on which are mounted to travel the sets of wheels D, carrying a float E, adapted to be struck at its lower end by the waves and the tide-water, so as to impart an upward traveling motion to the float E, the latter by its own weight traveling back into a lowermost position as soon as the force of the wave ceases or the tide recedes. In order to transmit this up-and-down traveling motion of the float E to a main shaft, the following device is provided: On each side of the float is secured one end of a cable, rope, or chain F, fastened at its other end on a drum G, on which the cable winds and unwinds, the drum being secured on a shaft H, extending transversely and journaled in suitable bearings carried by the float E. On the ends of the shaft H are secured pinions I, in mesh with inclined racks $C^2$, preferably formed on the top of the upper guide-rails C', previously mentioned, so that when the float E travels up or down the pinions I roll off on the racks $C^2$, and consequently impart a rotary motion to the shaft H. This rotary motion of the shaft H forces the drums G to wind up the cables F on the upward movement of the float E and to cause the cables to unwind from the drums during the downward movement of the float. The upper ends of the cables F pass over double sheaves J, secured on a transverse shaft K, journaled in suitable bearings arranged on the upper end of the framework B, so that when the cables wind up and unwind on the drums G a rotary motion is given to the sheaves J and shaft K alternately in opposite directions. In order to compensate for the expansion and contraction of the cables F, the cables pass from the sheaves J over pulleys L, journaled in bearings N, mounted to slide loosely in suitable guideways carried by the framework B, the said bearings being held in a normally lowermost position by weights N', connected by ropes to the bearings, so as to hold the cables taut at all times.

In order to transmit the rotary motion of the shaft K to a driving-shaft O to rotate the latter in one direction only, the following device is provided: On one end of the shaft K are secured the pulleys P and P', of which the pulley P is connected by a belt Q with a pulley R, mounted to rotate loosely on the shaft O, and the other pulley P' is connected by a crossed belt Q' with a pulley R', likewise mounted to rotate loosely on the shaft O. The pulleys R and R' are connected by pawl-and-ratchet mechanisms S with the shaft O, so that the rotary motions given by the pulleys P P' and belts Q Q' to the pulleys R R' are transmitted in one direction by the pawl-and-ratchet mechanisms to the shaft O. The latter is connected with the machinery to be driven by any suitable mechanism, and, if desired, a fly-wheel may be attached to the shaft O to steady the rotary motion.

The operation is as follows: When the float E is forced upward by the action of the waves or tide-water, the drums G are rotated in the directions of the arrow $a'$ to wind up the cables F and to turn the sheaves J, the shaft K, and pulleys P P' in the direction of the arrow $b'$. The rotary motion of the pulley P is transmitted to the shaft O by the belt Q, the pulley R, and the latter's pawl-and-ratchet mechanism S to rotate the shaft O in the direction of the arrow $c'$, it being understood that during this movement the rotary motion given to the pulley R' by the belt Q' and pulley P' does not affect the shaft O, as the pawl carried by the pulley R' rides backward over its ratchet-wheel. When the float E moves by its own weight down the inclined guideway, the drums G rotate in the inverse direction of the arrow $a'$ to cause the sheaves J, shaft K, and pulleys P P' to rotate in the inverse direction of the arrow $b'$, and the rotary motion of the pulley P' is now transmitted by the crossed belt Q', the pulley R', and its pawl-and-ratchet mechanism S to the shaft O to again rotate the latter in the direction of the arrow $c'$. During this movement the rotary motion given to the pulley R by the belt Q and pulley P is ineffective as far as the shaft O is concerned, as the pawl carried by the pulley R rides backward over the teeth of its ratchet-wheel. The float E may be locked to hold the same in an inactive position, and for this purpose locking-pawls T are provided, adapted to engage the racks $C^2$, the said pawls T being controlled by a lever T', fulcrumed on the float E and under the control of the operator.

From the foregoing it is evident that the float E is acted on by the buoyant force of the water, the tide force and the force of the waves impinging on or striking against the float.

The apparatus described will work equally well at low tide as at high tide, as the float E readily adjusts itself to the condition of the water.

I do not limit myself to the single float E shown and described, as it is evident that a plurality of such floats may be connected by the mechanism set forth to the shaft O. The wheels D have some clearance between their guide-rails C C', so that when the float E rises from the buoyancy of the water the wheels will be free to run on the upper guide-rails C'.

Having thus described my invention, I claim as new, and desire to secure by Letters Patent—

1. In a wave or tide power, the combination with a guideway, and a float movable thereon, of a driven shaft, a drum mounted on said float to travel therewith and having operative engagement with the guideway to be rotated on the rising-and-falling motion of the float, and operative connections between the drum and the driven shaft, as set forth.

2. A wave or tide motor, comprising an inclined guideway, a wheeled float mounted to travel on the said guideway and adapted to be moved up the guideway by the power of the waves or tides and arranged to travel upon the guideway by its own weight, means connected with the said float to convert the reciprocating motion thereof into rotary motion, the said means comprising a fixed rack, a pinion in mesh with the rack, a shaft carrying the pinion and journaled on the float, a drum on the shaft, a driven shaft journaled in fixed bearings and carrying a sheave, and a cable fastened at one end to the said float and winding and unwinding on the said drum and passing over the said sheaves, as set forth.

3. A wave or tide motor, comprising an inclined guideway, a wheeled float mounted to travel on the said guideway and adapted to be moved up the guideway by the power of the waves or tides and arranged to travel upon the guideway by its own weight, means connected with the said float to convert the reciprocating motion thereof into rotary motion, the said means comprising a fixed rack, a pinion in mesh with the rack, a shaft carrying the pinion and journaled on the float, a drum on the shaft, a driven shaft journaled in fixed bearings and carrying a sheave, a cable fastened at one end to the said float and winding and unwinding on the said drum and passing over the said sheave, and a transmitter for transmitting the forward-and-backward motion of the said driven shaft to a main shaft, as set forth.

4. A wave or tide motor, comprising sets of inclined guide-rails, a float having wheels mounted to travel on the said guide-rails, a shaft journaled on the said float, pinions on the said shaft, racks on the said guide-rails and in mesh with the said pinions, drums secured on the said shaft, a driven shaft journaled in fixed bearings at the head of the said inclined guide-rails and carrying sheaves, cables winding and unwinding on the said drums and passing over the said sheaves, and a compensating device for the said cables, as set forth.

5. In a wave or tide power, the combination with a guideway and a float, of a driven shaft, a shaft journaled on the float and geared to said guideway, whereby the rising-and-falling motion of the float will rotate the shaft which is carried thereby, connections between the float-carried shaft and the driven shaft, a main shaft, a transmitting mechanism between the driven shaft and the main shaft for propelling the latter continuously in one direction.

In witness whereof I have signed my name to this specification in the presence of two witnesses.

WILLIAM BORCHERT.

Witnesses:
JAMES G. SWEENEY,
WARREN NESMITH.